June 21, 1938.                    E. E. VON BEHREN                    2,121,555
                                  SAFETY CONTROL BRAKE
                                  Filed Oct. 14, 1936                 3 Sheets-Sheet 1
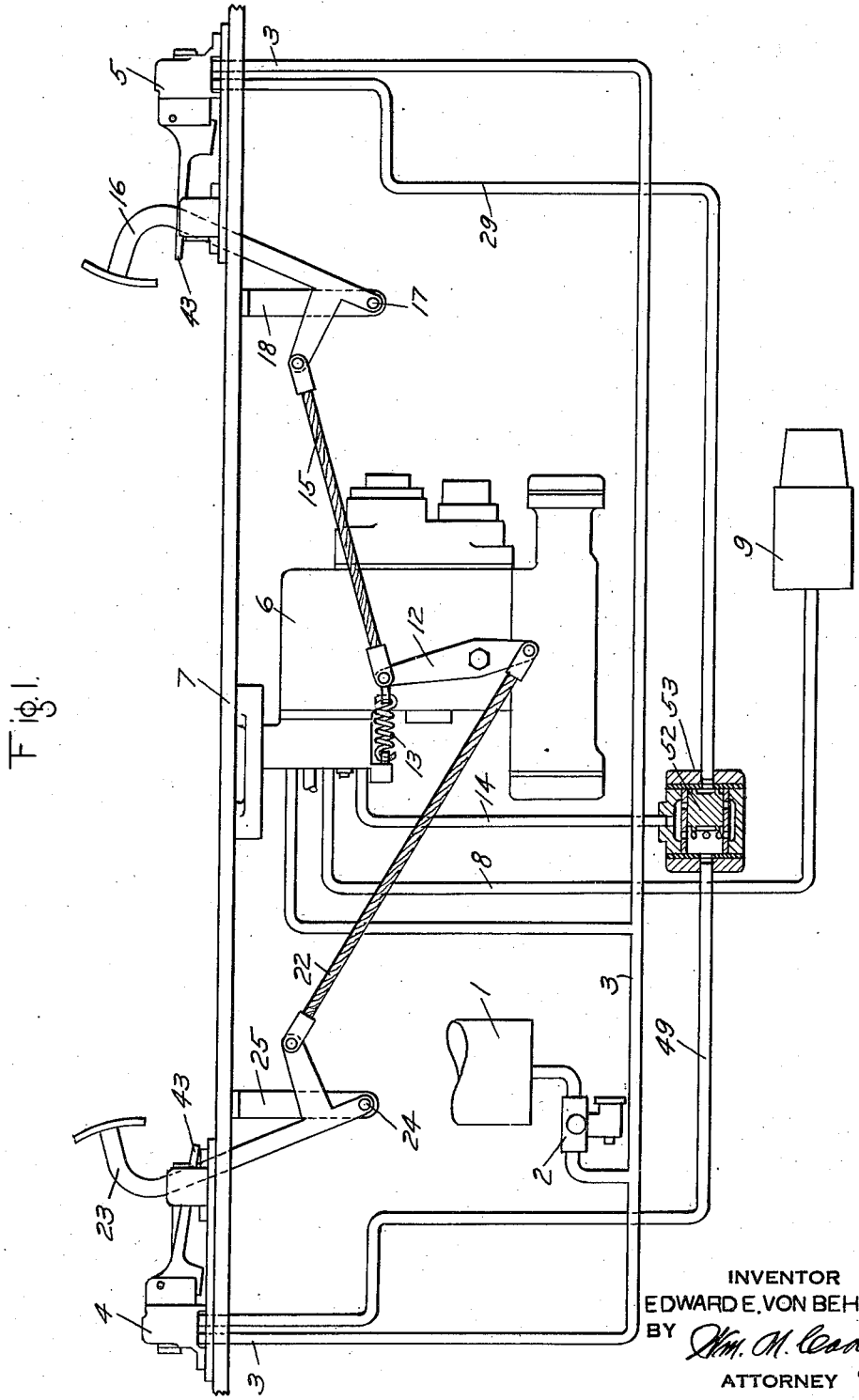
INVENTOR
EDWARD E. VON BEHREN
BY
Wm. M. Cady
ATTORNEY

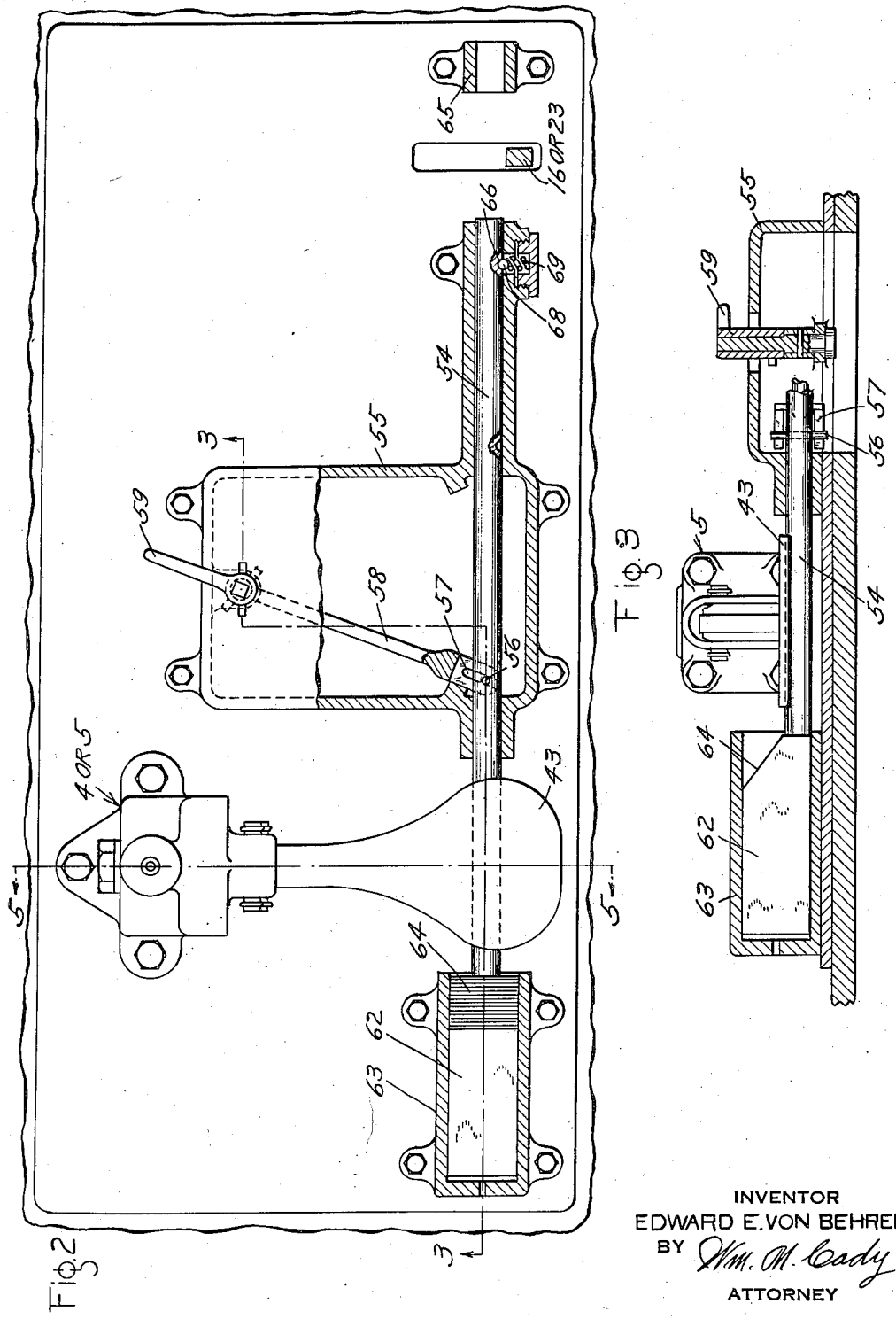

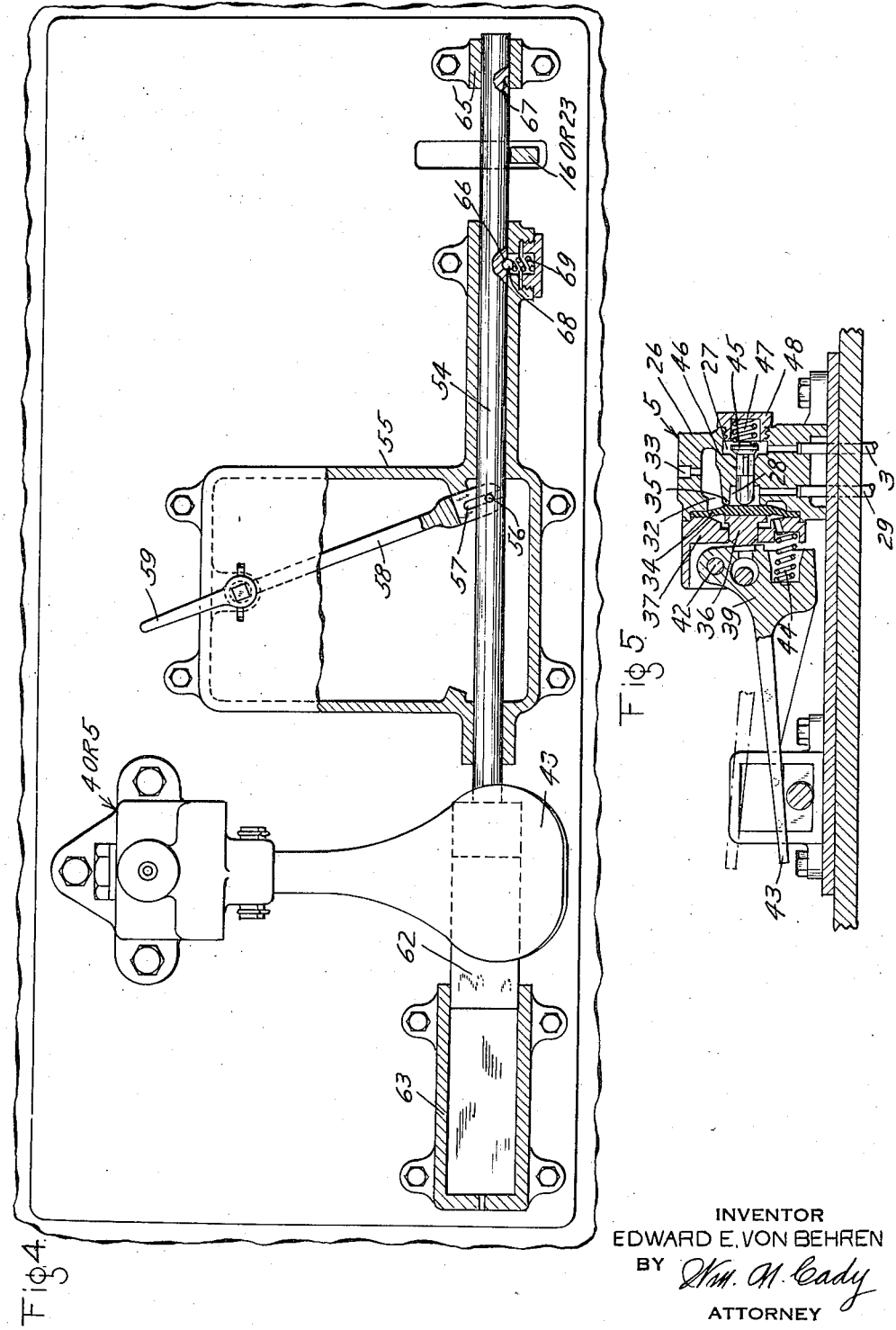

Patented June 21, 1938

2,121,555

UNITED STATES PATENT OFFICE 2,121,555

SAFETY CONTROL BRAKE

Edward E. Von Behren, St. Louis, Mo., assignor to The Westinghouse Air Brake Company, Wilmerding, Pa., a corporation of Pennsylvania Application October 14, 1936, Serial No. 105,547

9 Claims. (Cl. 303—19)

This invention relates to a safety control brake for vehicles and more particularly to a locking device for use on vehicles provided with brake equipment that is adapted for double end operation.

It is frequently desirable to provide street cars and similar vehicles with brake equipment adapted for double end operation and which provides brake control mechanism at each end of the vehicle, the one or the other of which may be employed to control the braking in accordance with the direction of travel of the vehicle.

It is an object of my invention to provide a locking device for use on vehicles of the above described character for locking the brake control mechanism at one end of the vehicle in an inoperative position while the mechanism at the other end of the vehicle is being employed to control the brakes.

It is a further object of my invention to provide a braking device for use on vehicles employing brake pedal control mechanism for controlling the release and application of the brakes.

Other objects and advantages of my invention will appear from the following description of one preferred embodiment thereof, reference being had to the accompanying drawings, in which, Fig. 1 is a schematic view of apparatus organized in accordance with one embodiment of my invention, Fig. 2 is a view, partly in plan and partly in horizontal section, of the control mechanism and locking mechanism therefor, Fig. 3 is a vertical sectional view taken substantially along the line 3—3 on Fig. 2 and showing the locking mechanism, Fig. 4 is a plan view of the locking mechanism in locked position, and Fig. 5 is a sectional view of the foot valve device this view being taken substantially along the line 5—5 on Fig. 2.

Referring to Fig. 1 of the drawings, a main reservoir 1 is provided constituting a source of fluid under pressure from which fluid is supplied at a reduced pressure by the feed valve 2 to a main reservoir pipe 3 that communicates with the foot valve devices 4 and 5 at opposite ends of the vehicle, and with a self-lapping brake valve device 6 which may correspond to that illustrated in an application of Ellis E. Hewitt for Railway vehicle brake systems, Serial No. 28,389, filed June 26, 1935, and assigned to the same assignee as this application. The self-lapping brake valve device 6 may be supported on the underside of the car floor 7, and is effective to supply fluid under pressure through brake cylinder pipe 8 to the brake cylinder 9 in accordance with the amount of movement of the operating lever 12 from its release position against the bias of a spring 13, one end of which is connected to the upper end of the lever 12 and the other end of which is connected to a lug on the casing of the self-lapping brake valve device 6. The self-lapping brake valve device 6 is also provided with an emergency piston chamber and mechanism that is responsive to the pressure therein and is effective to cause an emergency application of the brakes upon a predetermined decrease in pressure in said emergency piston chamber, the emergency piston chamber being in open communication with a safety control pipe 14 that is normally charged with fluid under pressure from the main reservoir pipe 3 through one of the foot valve devices 4 or 5.

The operating lever 12 of the self-lapping brake valve device 6 may be actuated from its release position either by means of the cable 15, one end of which is attached to the upper end of the lever 12 and the other end of which is attached to a brake pedal 16 that is pivotally supported on a pivot pin 17 mounted in a bracket 18 extending downwardly from the car floor 7, or by a similar cable 22 and brake pedal 23 that is mounted on a pivot pin 24 in a bracket 25 extending downwardly from the car floor 7 at the opposite end of the car.

The foot valve devices 4 and 5 are alike in construction, and, as best shown in Fig. 5, each comprises a casing 26 containing a valve chamber 27 that is in constant open communication with the main reservoir pipe 3, a chamber 28 that is in constant open communication with a branch (such as 29) of the safety control pipe 14, and a chamber 32 that is in constant open communication with the atmosphere through exhaust port 33. A diaphragm valve 34 is provided for engaging a rib seat 35 to control communication between the chambers 28 and 32 and is urged against its rib seat by a follower 36 extending through an opening in the wall 37 of the foot valve casing, the inner end of which engages the diaphragm 34, and the outer end of which is engaged by a manually operable lever 39 that is pivotally supported on a pin 42 and is provided with a portion 43 adapted to receive the pressure of the operator's foot for maintaining the device in its illustrated position. A spring 44 is provided, one end of which engages in a recess in the wall 37 and the other end of which engages in a recess in the lever 39 for actuating the lever 39 in a clockwise direction against the foot pressure that may be applied to the portion 43.

A valve 45 is provided within the chamber 27 having a stem 46 extending through a bore in the wall between the chambers 27 and 28, and is adapted to be engaged by the diaphragm valve 34 when the diaphragm valve is in its seated position to hold the valve 45 from its seat against the bias of a spring 47, one end of which engages the valve 45 and the other end of which engages a recess in the cap nut 48, closing the outer end of the chamber 27. When the several parts of the foot valve device are in the positions illustrated in Fig. 5 the safety control pipe 14 is charged from the main reservoir pipe 3 through chamber 27, past the unseated valve 45 and chamber 28 of the foot valve device and branch pipe 29. The supply of fluid under pressure either through branch pipe 29 from the foot valve device 5 or through branch pipe 49 from foot valve device 4, causes the double check valve 52 in the valve device 53 to be forced to the left or right, respectively, to effect communication between the branch pipe 29 or 49, from which fluid is supplied, to the safety control pipe 14.

If, after the safety control pipe has been charged, the operator relieves foot pressure from the lever 43, this lever will be forced by the spring 44 in a clockwise direction, as viewed in Fig. 5, thus permitting the spring 47 to force the valve 45 to its seat to close communication between the main reservoir pipe 3 and the chamber 28 and to the safety control pipe, as above traced, the valve stem 46 forcing the diaphragm valve 34 from its seat to effect communication between the safety control pipe and the atmosphere through chambers 28 and 32 and exhaust port 33, to vent the safety control pipe and cause the operation of the self-lapping valve device 6 to supply fluid under pressure from the main reservoir pipe 3 to the brake cylinder 9 to effect the application of the brakes in a well known manner.

Referring to Figs. 2, 3 and 4, means is provided for locking the brake levers 16 and 23 against forward movement, and for locking the levers 43 of the foot valve devices 5 and 4 in their upper positions, comprising a mechanism at each end of the car having a locking bolt 54 guided in a casing 55 and carrying a pin 56 that is adapted to be engaged by the bifurcated end 57 of a lever 58 that may be actuated by a handle 59 to move the bolt from the position shown in Figs. 2 and 3 to that shown in Fig. 4, or in the reverse direction. A block 62 is carried on one end of the bolt 54 and may be guided within a casing 63, and is provided with a sloping surface 64 to better enable it to slide under the lever 43 when moved from the position shown in Figs. 2 and 3 to the position shown in Fig. 4. An eyelet 65 is provided for receiving the end of the bolt 54 when moved into locking position. Recesses 66 and 67 may be provided in the bolt 54 for receiving a ball 68 that is spring-pressed toward the bolt by a spring 69 to prevent undesired movement of the bolt 54 from either of its operative positions.

When the vehicle is being controlled from one end, the locking mechanism at that end of the vehicle will be in the unlocked position, as illustrated in Figs. 2 and 3, thus permitting the lever 43 of one of the foot valve devices 4 or 5 to be urged to its lower position, as shown in Figs. 5 and 3, and permitting the brake lever 23 or 16 to be moved forwardly to effect the application of the brakes. The locking mechanism at the opposite end of the car will be in the position shown in Fig. 4, the end of the bolt 54 thus preventing the brake lever 16 or 23 from being moved forwardly, and the block or wedge 62 being in the position shown in dotted lines to prevent the lever 43 of the foot valve device from being pressed downwardly to the positions illustrated in Figs. 3 and 5.

When one of the foot valve devices is locked with the lever 43 in its upper position, the branch safety control pipe 29 or 49 therefrom will be connected to atmosphere through exhaust port 33 of the associated foot valve device, so that upon depressing the lever 43 of the other foot valve device the double check valve 52 will close communication between the safety control pipe 14 and the branch pipe that is at atmospheric pressure. For example, in Fig. 1, the branch pipe 29 will be at atmospheric pressure, since the lever 43 of the foot valve device 5 is in its upper position and the branch pipe 49 will be supplied with fluid under pressure at main reservoir pipe pressure, since the lever 43 of the foot valve device 4 is in its lower position corresponding to the position shown in full lines in Fig. 5. The supply of fluid under pressure from the main reservoir pipe 3 to the foot valve device 4 and the branch safety control pipe 49 will force the double check valve 52 to the right or to its illustrated position, to effect communication between branch pipe 49 and safety control pipe 14.

When the operator desires to change the control of the car from one end of the car to the other, it is necessary to return the brake control lever 16 or 23 that has been employed to control the brakes to its release position before the bolt 54 is moved to locking position. Pressure will be relieved from the lever 43 of the associated foot valve device before the bolt 54 is moved to locking position, thus effecting an emergency application of the brakes. The brakes, thus applied, will remain applied until the operator has moved the bolt 54 at the other end of the car to its unlocked position and applied sufficient pressure to the lever 43 of the foot valve device at that end of the vehicle to move it from its upper or dotted line position, as viewed in Fig. 5 to its lower, or full line position.

It will be seen that when the operator is stationed at one end of the car the pedal of the foot valve device at the other end of the vehicle is locked in the position to connect the safety control pipe to the atmosphere, while the lever for controlling the self-lapping brake valve device is also locked in the release position. This prevents movement of these members by passengers or others, and thereby prevents undesired interference with the operation of the car. The key or handle 59 may be made detachable so that it may be removed when the bolt 54 has been moved to the locking position and thus prevent unauthorized movement of this bolt to the release position.

It will be obvious to one skilled in the art that many modifications in the illustrated embodiment of my invention may be made within the spirit of my invention and I do not wish to be limited otherwise than by the scope of the appended claims.

Having now described my invention, what I claim as new and desire to secure by Letters Patent, is:

1. In a safety control brake for vehicles, in combination, brake control means at each end of the vehicle for controlling the application and release of the brakes comprising a plurality of independently movable foot controlled levers, and common means for locking the control levers at one end of the car in inoperative position when employing the levers at the other end of the car to control the brakes.

2. In a safety control brake for vehicles, in combination, fluid pressure braking means, a brake valve device for effecting the application and release of the brakes, a normally charged safety control pipe, control means at each end of the car comprising a manually operable lever for controlling the brake valve device independently of said safety control pipe pressure for effecting the application and release of the brakes and a manually operable lever for venting said control pipe to effect an emergency application of the brakes, said manually operable levers being movable independently of each other, and common locking means for locking said several levers at one end of the car in an inoperative position when it is desired to control the brakes by the levers at the other end of the car.

3. In a safety control brake for vehicles, in combination, fluid pressure braking means, a normally charged safety control pipe, a self-lapping brake valve device for effecting the application and release of the braking means and having a pressure responsive means responsive to a reduction in control pipe pressure for effecting the emergency application of the brakes, control means at each end of the vehicle comprising a manually operable brake controlling foot lever for controlling said brake valve device to effect service applications of the brakes independently of said means responsive to safety control pipe pressure, and a manually operable foot valve device for controlling communication from said safety control pipe to a source of fluid under pressure and to the atmosphere, the foot valve device at the front end of the car being normally held by the operator's foot in a lower position to effect the charging of the safety control pipe from said source, said foot valve device being effective upon the release of pressure therefrom to vent the safety control pipe and effect an emergency application of the brakes, a double check valve operated by fluid under pressure supplied from one foot valve device to open communication from said foot valve device to the brake valve device and for closing the fluid pressure communication from the brake valve device to the other foot valve device, and locking means comprising a bolt and a wedge associated therewith for locking said brake controlling foot lever and said foot valve device at one end of the vehicle in an inoperative position when it is desired to control the brakes from the other end of the vehicle.

4. In a safety control brake equipment for double end control of a car, in combination, a brake equipment having a brake control mechanism at each end of the car comprising a normally charged safety control pipe and a foot valve device having a lever normally pressed downwardly by the operator's foot to effect the charging of the safety control pipe, said brake equipment being effective upon the release of pressure from said lever to vent the safety control pipe to effect an emergency application of the brakes, a brake pedal adapted to be moved forwardly to effect service application of the brakes, and locking means comprising a bolt, one end of which when moved to a locking position intercepts the path of travel of the brake pedal to prevent service application of the brakes, said bolt being provided with a wedge movable to prevent downward movement of the lever of the foot valve device to prevent the charging of the safety control pipe from the associated end of the car.

5. In a safety control brake for vehicles, in combination, a brake cylinder, means for supplying fluid under pressure to the brake cylinder to apply the brakes, and control means therefor comprising a brake control lever and a foot valve device at each end of the vehicle, said brake control lever and said foot valve device being operable independently of each other, and common means for locking the foot valve device and the brake control lever at either end of the vehicle against movement to apply the brakes.

6. In a vehicle brake equipment, in combination, a member operable on the application of manually applied pressure to effect the release of the brakes, a member operable on the application of manually applied pressure to effect an application of the brakes, said members being operable independently of each other, and locking means movable between a locking position and a release position, said locking means comprising an element operable in the locking position of said locking means to extend into the path of movement of said members to prevent unauthorized movement thereof on the application of manually applied pressure thereto.

7. In a vehicle fluid pressure brake equipment, in combination, a valve means operative on a reduction in the pressure of the fluid supplied thereto to effect an application of the brakes, a brake cylinder, a brake valve device for supplying fluid under pressure to and for releasing fluid under pressure from said brake cylinder, and control means for said valve means and said valve device, said control means comprising manual operating members at each end of the vehicle for operating said valve device, valve mechanism at each end of the car and having associated therewith manual control members for conditioning said valve mechanisms to supply fluid under pressure to or release fluid under pressure from a communication through which fluid under pressure may be supplied to and released from said valve means, means operative on the supply of fluid under pressure by either of said valve mechanisms to said valve means to cut off communication between said valve means and the other of said valve mechanisms, the control means at each end of the car having associated therewith a locking element movable between a release position and a locking position, said element being operable in the locking position to prevent unauthorized movement of the operating and control members at said end of the vehicle.

8. In a vehicle brake equipment, in combination, a pair of members pivotal about substantially parallel axes, said members each having a normal position, one of said members being operable to effect an application of the brakes on movement from its normal position in one direction about its axis, the other of said members being operable to effect the release of the brakes on movement from its normal position in the other direction about its axis, and locking means for said members comprising an element movable between a release position and a locking position, said element being operable in the locking position to extend between said members and to prevent movement of either of said members from its normal position.

9. In a vehicle brake equipment, in combination, application means operable to effect applications and release of the brakes, other application means operable to effect applications and release of the brakes, a movable member having a normal position and being operable on movement therefrom to condition one of said application means to effect the release of the brakes, another movable member independent of said first named movable member, said other movable member having a normal position and being operable on movement therefrom to condition the other of said application means to effect the application of the brakes, and a locking element movable between a release position and a locking position, said element being operable in the locking position to prevent movement of either of said members away from its normal position.

EDWARD E. VON BEHREN.